United States Patent [19]

Bahr

[11] 3,715,674

[45] Feb. 6, 1973

[54] ELECTRICALLY CONTROLLED REFLECTION OF ACOUSTIC SURFACE WAVES

[75] Inventor: Alfred J. Bahr, Mountain View, Calif.

[73] Assignee: Stanford Research Institute, Menlo Park, Calif.

[22] Filed: July 23, 1971

[21] Appl. No.: 165,638

[52] U.S. Cl. ........................330/12, 330/5.5, 333/30, 331/96

[51] Int. Cl. ..............................H03h 7/30, H03f 3/04

[58] Field of Search ....330/12, 38 M, 53; 333/30, 71, 333/72

[56] References Cited

UNITED STATES PATENTS 3,559,115 1/1971 De Vries ...............................333/30

3,609,593 8/1971 Boll et al. ..............................333/71

*Primary Examiner*—Roy Lake

*Assistant Examiner*—Darwin R. Hostetter

*Attorney*—Lindenberg, Freilich & Wasserman

[57] ABSTRACT

A circuit is provided for tuning out the reactance established at the electrical port of an acoustical surface wave transducer thereby providing near perfect reflection of the acoustic surface waves. The variable impedance circuit, which is controlled electrically, besides a positive reactance generates a negative resistance that can be used to provide reflection and transmission gain for the surface waves.

5 Claims, 2 Drawing Figures

INVENTOR
ALFRED J. BAHR
BY Lindenberg, Freilich & Wasserman
ATTORNEYS

ELECTRICALLY CONTROLLED REFLECTION OF ACOUSTIC SURFACE WAVES

FIELD OF THE INVENTION

This invention relates to acoustic delay lines and more particularly to improvements therein.

An acoustic delay line, usable up to microwave frequencies, has been developed which comprises a bar of a piezoelectric material which has a transducer near one end, usually of the interdigital type and a means for reflecting surface waves which are generated by that interdigital transducer at the other end. The interdigital transducer comprises spaced conductors which are deposited on the surface of the piezoelectric material. The arrangement for the transducer usually is in the form of two oppositely facing combs, the teeth of which are interleaved with one another. The combs, obviously are conductors.

It has been shown that the reflection coefficient at the acoustic ports of an interdigital surface wave transducer, of the type broadly described above, are very sensitive to the load at the electrical port, especially when that load tunes out the capacitance of the transducer.

OBJECTS AND SUMMARY OF THE INVENTION

An object of this invention is the provision of an arrangement for cancelling the impedance seen looking into the electrical port of an acoustic surface wave transducer and thereby controlling the acoustic reflection and transmission properties of the transducer.

Yet another object of the invention is the provision of an arrangement for electrically establishing an open circuit at the acoustic port of a surface wave delay line and thereby providing a means for efficiently reflecting acoustic surface waves and for efficiently controlling such reflection.

Still another object of the invention is the provision of a novel and useful improvement in a surface acoustic wave delay line.

These and other objects of the invention are achieved in a surface acoustic wave delay line circuit arrangement, which employs two or more transducers by connecting to an electric port of a transducer a circuit which has the capability of providing an impedance which can be varied with the amplitude of the electrical signal applied to that circuit. The reactance provided by the transducer may be tuned out with that circuit or left partially in, and negative resistance may be provided whereby the reflection of the acoustic surface waves may be improved and also controlled electrically.

DESCRIPTION OF THE PREFERRED EMBODIMENTS

Figure 1:
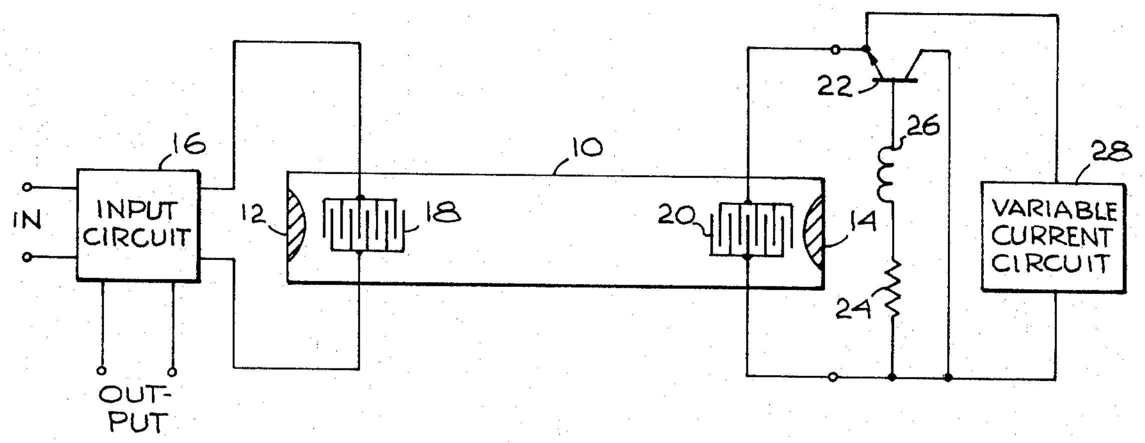
FIG. 1 is a simplified schematic illustrating the embodiment of this invention.

It has been found that the reflection coefficient at the acoustic ports of an interdigital surface wave transducer is very sensitive to the load at the electrical port, especially when that load tunes out the capacitance of the transducer. If the load is designated by its admittance $Y_L = G_L + jB_L$, the reflection coefficient at one acoustic port when the other acoustic port is matched is (at $f_o$)

$$|\Gamma|^2=\frac{1}{\left(1+\frac{G_L}{\hat{G}_a}\right)^2+\left(\frac{B_L+\omega_0 C_T}{\hat{G}_a}\right)^2} \qquad (1)$$

where $\hat{G}_a$ is the radiation conductance seen at the electrical port of the transducer (at $f_o$) and $C_T$ is the total static capacitance of the transducer. When $B_L = -\omega_o C_T$ and $G_L/\hat{G}_a \leq O$, we have $|\Gamma|^2 \leq 1$. Thus only in the ideal lossless tuned case is it possible to get complete reflection.

If the load is considered as a series impedance, $Z_L = R_L + jX_L$, the expression for acoustic reflection coefficient becomes $$|\Gamma|^2=\frac{1+\left(\frac{R_L}{X_L}\right)^2}{\left[1+\frac{R_L}{X_L}\cdot\frac{\omega_0 C_T}{\hat{G}_a}\right]^2+\left[\left(1-\frac{1}{\omega_0 C_T X_L}\right)\frac{\omega_0 C_T}{\hat{G}_a}-\frac{R_L}{X_L}\right]^2} \qquad (2)$$

Again, if $X_L = 1/\omega_o C_T$ and $R_L/X_L \leq 0$, we have $|\Gamma|^2 \leq 1$.

Now suppose that the load at the electrical port is an active circuit such that $G_L$ or $R_L$ is negative. Then it becomes possible to obtain reflection gain at the acoustic port (more than 100 percent of the incident acoustic power reflected). For example, from Eq. (1) it may be seen that "infinite" gain will occur when $$B_L = -\omega_o C_T \qquad (3)$$

and $$G_L = -\hat{G}_a. \qquad (4)$$

For a series load impedance, Eq. (2) shows that "infinite" gain will occur if $$1/(\omega_o C_T X_L) = 1 + (R_L/X_L)^2 \qquad (5)$$

and $$R_L/X_L = -\hat{G}_a/\omega_o C_T. \qquad (6)$$

On the other hand, if $B_L > 0$ in Eq. (1), or $X_L < 0$ in Eq. (2), it may be seen that the reflection at the acoustic port can be very small. Thus, if the active circuit loading the electrical port of the interdigital transducer is capable of being switched from a state that provides a high reflection at the acoustic port to a state providing low reflection at the acoustic port, not only is there provided a means of efficiently reflecting acoustic surface waves, but also of controlling that reflection electrically.

FIG. 1 shows the schematic drawing of an acoustic delay line suitable for use to microwave frequencies. It comprises a piezoelectric crystal 10 having black wax terminations 12, 14, applied to both ends in a manner well known in the art. A signal is applied by an input circuit 16, including a directional coupler, to an interdigital transducer 18. This comprises conductors which have been deposited on the surface of the delay line, which are in the form of two combs which are positioned opposite one another to have their teeth interleave. A signal applied to the interdigital transducer 18 excites an acoustic wave in the surface of the delay line material 10, which travels to the other end of the delay line frOm which it is reflected back to the interdigital transducer 18. Since the surface acoustic wave is accompanied by an electric field, a voltage is induced in the interdigital transducer 18 when the acoustic wave returns which is applied to the circuit 16 for utilization.

In accordance with this invention, a second interdigital transducer 20 is positioned adjacent the reflection end of the delay line. This is connected to an active impedance circuit, by which is meant a circuit which can be electrically controlled to produce a desired impedance at its terminals. By way of example, there is illustrated a transistor 10 having an inverted common collector configuration. The emitter of the transistor is connected to one terminal of the interdigital transducer 20. The collector of the transducer is connected to the other terminal of the interdigital transducer and also to the base of the transistor through a serially connected resistor 24 and inductance 26.

It should be noted that the electrical port of the arrangement shown in FIG. 1 is at the inter-digital transducer 18 and the acoustical reflection takes place at the interdigital transducer 20. By means of the inverted common collector configuration of the transistor 22, which is connected to the electrical port of transducer 20, it is possible to tune out the capacitance presented by transducer 20. This is done by measuring the input impedance of transducer 20 and of the inverted common collector circuit and adjusting the inverted common collector circuit accordingly.

An observation of the input reflection coefficient of the circuit shown in FIG. 1, as a function of the applied frequency, as the emitter current is changed, indicates that there is a change in the amount of negative resistance generated by the inverted common collector circuit while the reactance remains relatively constant.

At a constant frequency, as the emitter current in the transistor is increased, thus increasing the magnitude of the negative resistance, there is an increase in the acoustic reflection gain, the amplitude of the acoustic wave reflected at the transducer 20 is larger, and the greater is the change in the input reflection coefficient. Another way of looking at this is to view the delay line as an acoustic resonator with a weak coupling at the input. Increasing the reflection gain increases the Q of the resonator and eventually, if the Q is increased enough, it should be possible to obtain a match at the input to the resonator. The expected behavior of the input reflection coefficient as a function of the emitter current was indeed observed. It therefore appears, that it is feasible to control the reflection of acoustic surface wave electrically.

Figure 2:
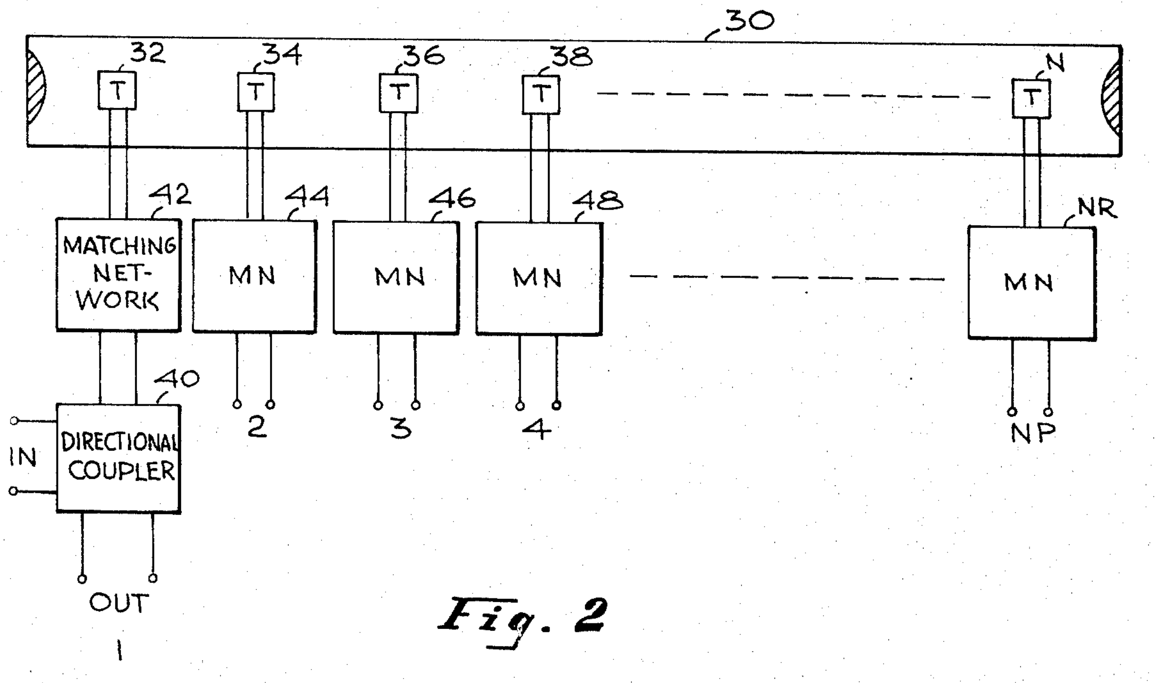
FIG. 2 is a schematic representing another embodiment of this invention.

Referring now to FIG. 2, there may be seen represented schematically a surface wave, variable delay acoustic delay line in accordance with this invention. It comprises a bar of piezoelectric material 30, spaced along the surface of which are deposited transducers, respectively 32, 34, 36, 38 . . . N. Input to the acoustic delay line is by way of a directional coupler which applies a received signal to a matching network 42, which matches the directional coupler to the input transducer 32. Each of the other transducers 34 through N has connected to it matching networks 44, 46, 48 . . . . NR each of which includes an active circuit of the type exemplified by the inverted common collector network of FIG. 1. The input-output port is designated at 1, the other ports are designated by the numbers 2, 3, 4 . . . NP.

If the networks 44 through NR, are simply matching networks and energy is introduced at port 1, the largest amount of energy will exit at the port where the matching network has been adjusted for a match (the minimum loss is 6dB because of the bi-directionality of the transducers). Alternatively, the delay line can be operated as a 1-port device with the delay being determined by which matching network has been adjusted to provide a strong acoustic reflection. The other networks in this case would be adjusted to provide a minimum or no acoustic reflection. Since gain is possible the device could show a net loss of zero B. At frequencies of a few hundred megahertz, the minimum increment in delay for this device could easily be on the order of 50 nanoseconds.

The latter method of operation can also be made to provide a 2-port device by utilizing port 2 as the input and port 1 as the output. Port 1 would be kept closed by suitable gatinG until the incident pulse is passed by, after which it could be opened.

By using transducers 32, 34 and 36 and suitable gating and coupling between ports 1 and 3, a recirculating surface wave delay line can be achieved which can produce long time delays or a frequency memory, or even can be used as an oscillator.

As a variable delay line, input is applied to port 1, and the extent of delay required is determined by which one of the matching networks is tuned, with the remaining networks not being tuned. For example, if matching network 44 is tuned then the remaining networks are not tuned, and if thereafter matching network 48 is tuned and the remaining networks are left untuned, then the delay obtained with matching network 44 tuned is one-third of that obtained when matching network 48 is tuned.

Since both the amplitude and phase of an acoustic reflection can be varied as a function of voltage, an AM or an FM mOdulation, or a voltage controlled phase shifter can be achieved by varying the voltage of one of the matching networks, whereby the pulse which is reflected has its amplitude and/or phase varied.

Doppler simulation can be achieved by varying the voltages on all of the networks so that an acoustic mismatch appears to propagate toward or away, from the incoming pulse with a given velocity. Such a technique can also be used to produce pulse compression or expansion.

From the foregoing description, there has been shown an arrangement for electrically controlling the reflection of an acoustic surface wave and producing gain in the reflected and transmitted wave also.

What is claimed is:

1. In a surface acoustic delay line of the type wherein an input circuit applies a signal to a first transducer at the signal input end and a second transducer is at the location from which a reflection is desired, the improvement comprising:

an electrically controlled variable impedance means connected to said second transducer for establishing a reactance which tunes out the reactance of the second transducer.

2. In an acoustic delay line as recited in claim 1 wherein said variable impedance means includes means for providing a negative resistance for affecting the reflection characteristics and establishing transmission gain for said delay line.

3. An acoustic delay circuit as recited in claim 1 wherein the electrically controlled variable impedance meanS includes a transistor having an inverted common collector configuration.

4. A surface acoustic wave delay line circuit arrangement comprising a body of acoustic delay material having spaced therealong at desired locations, surface wave transducers, each surface wave transducer having connected thereto an electrically controlled variable impedance circuit, and means for setting the values of said variable impedances at desired values for establishing desired reflection and transmission characteristics for said body of acoustic delay material for acoustic surface waves.

5. A surface wave acoustic delay line circuit arrangement as recited in claim 4 wherein said variable impedance circuit provides a positive reactance and a negative resistance.

* * * * *